United States Patent
Handler

(10) Patent No.: US 7,837,156 B1
(45) Date of Patent: Nov. 23, 2010

(54) CABLE SUPPORT HOOK

(76) Inventor: Jordan Handler, 4 International Dr., Rye Brook, NY (US) 10573

( * ) Notice: Subject to any disclaimer, the term of this patent is extended or adjusted under 35 U.S.C. 154(b) by 0 days.

(21) Appl. No.: 12/581,454

(22) Filed: Oct. 19, 2009

(51) Int. Cl.
    *E21F 17/02* (2006.01)
(52) U.S. Cl. .............................. 248/58; 248/63; 248/339
(58) Field of Classification Search ................... 248/58, 248/62, 63, 65, 73, 339, 201, 74.1; 211/199
    See application file for complete search history.

(56) References Cited

U.S. PATENT DOCUMENTS

| | | | |
|---|---|---|---|
| 3,185,418 A * | 5/1965 | Appleton ..................... | 248/72 |
| 4,783,029 A * | 11/1988 | Geppert et al. ............ | 248/74.1 |
| 6,220,554 B1 * | 4/2001 | Daoud ........................ | 248/74.1 |
| 6,629,676 B1 * | 10/2003 | Gretz ........................... | 248/58 |
| 7,407,138 B1 | 8/2008 | Gretz | |
| 7,520,476 B2 * | 4/2009 | Caveney et al. ............... | 248/72 |
| 2003/0102412 A1 * | 6/2003 | Miescher ..................... | 248/62 |
| 2005/0184202 A1 * | 8/2005 | Cox et al. .................... | 248/63 |
| 2008/0093510 A1 | 4/2008 | Oh et al. | |
| 2009/0057498 A1 * | 3/2009 | Oh et al. ..................... | 248/68.1 |

FOREIGN PATENT DOCUMENTS

CA 2315025 2/2001

* cited by examiner

*Primary Examiner*—Ramon O Ramirez
(74) *Attorney, Agent, or Firm*—Ostrolenk Faber LLP

(57) ABSTRACT

A cable support hook of a general "J" shape with a rear leg, a front leg and a web joining the legs. A platform at the top of the rear leg extends parallel to the web. Slides at the top of the platform of a hook below may be received in rails at the bottom of the web of a hook above and the hook below is slid rearwardly along the guidance provided by the slides and the rails to stack the hook below beneath the hook above. No additional fastenings between the hooks are required.

13 Claims, 5 Drawing Sheets

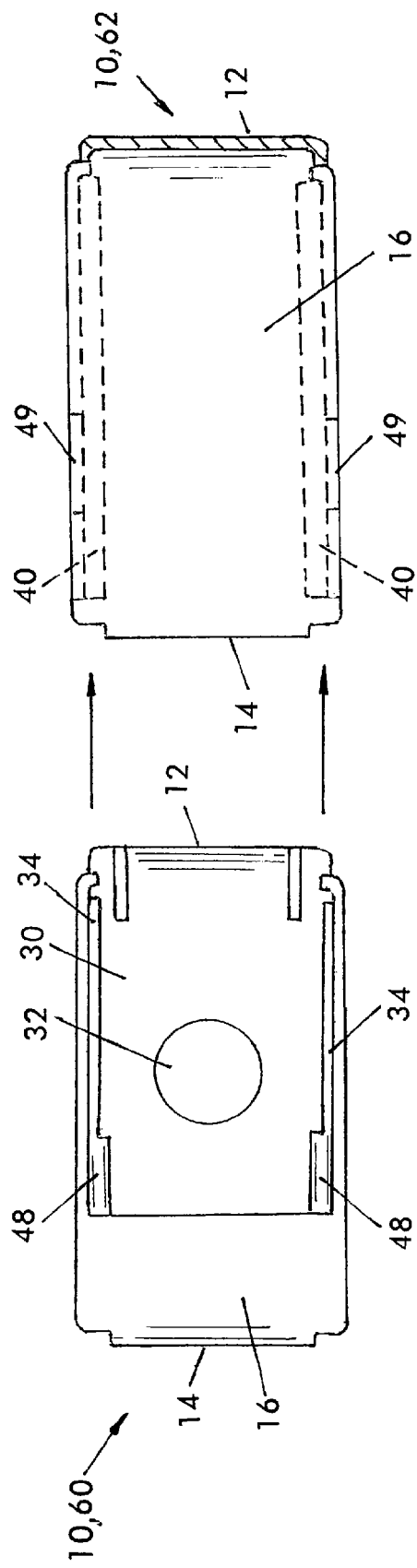
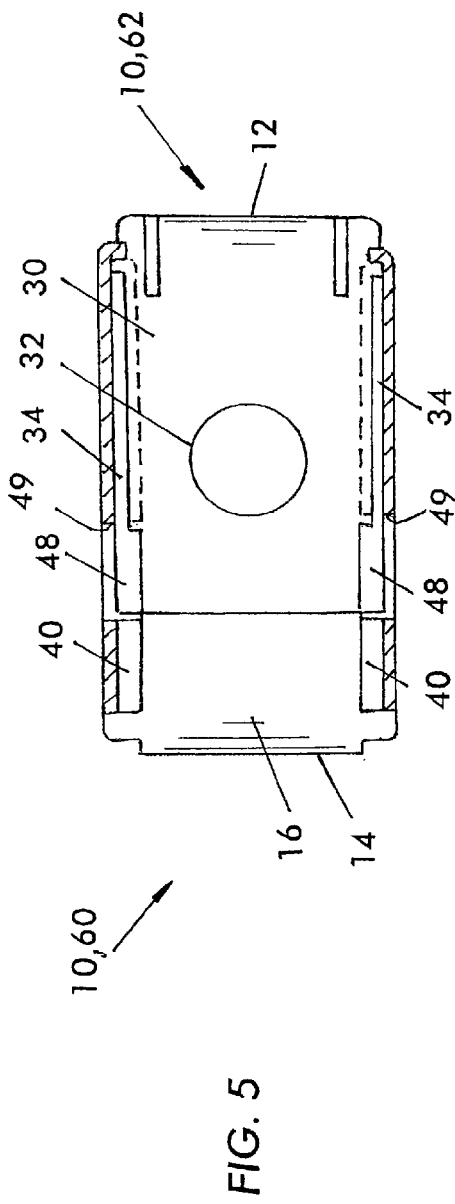
FIG. 4
FIG. 5

CABLE SUPPORT HOOK

BACKGROUND OF THE INVENTION

The present invention relates to a cable support hook for supporting cable passing the hook.

Cable extends on a path along the outside of or inside a ceiling or wall in an enclosure, house or commercial or industrial building. The cable is typically used for supplying electrical energy, communication cables, data transmission cables, fiber optic cables, or the like. The cable is typically supported along its path.

In one cable support configuration, a series of spaced apart cable support hooks support and define a path for the cable. The cable hooks are apart and generally close enough together along the path so that the cable is adequately supported. Each hook may be of a generally "J" shape, including a rear leg by which the hook is attached to some support, a usually shorter height front leg and a web joining the front and rear legs. The cable is supported in the notch at the web between the front and rear legs.

Sometimes more than one type of cable is transmitted along the path, such as electric power cable, electric or electronic communications cable and data transmission cable. There might be electrical interference between cable transmissions, such as a field effect from one type of cable to the other. Therefore, it may be desirable to separate different types of cable running along the same path. Sometimes more cables extend along the same path than may be comfortably contained within the notch of one hook. Other situations may arise where the cables extending along one path should be separated.

Usually each hook is supported by its rear support leg on a support. Sometimes the support is the ceiling or wall along which hooks are arrayed. Sometimes the support is a separately provided support, like a post, for a set of the hooks positioned at a spaced apart location along the cable path. Sometimes two or more hooks are positioned at one location along the cable path.

The present invention particularly concerns an arrangement wherein a plurality of hooks at least one location along a path of the cables are ganged or supported to each other without need for an extra common support element to which each of the hooks is individually directly connected. In such an arrangement, only one of the hooks in the ganged array need be connected to a support and other hooks may be supported by connection to the supported hook, so that the hooks are supported in a series arrangement from the supported hook.

The prior art shows examples of ways to attach or gang cable support hooks.

U.S. Pat. Nos. 7,407,138 and 6,629,676 show a box or platform located at the top of a hook and an opening in the box or platform that enables suspended support of the hook. The lateral sides, front and rear of the box have openings. Beneath a web below a hook there are depending tabs with tab openings that can be aligned with the box openings at the top of a hook disposed next below. The aligned openings receive fasteners that hold the tabs below the web of the hook above to the sides of the box above the hook below and thereby attach one hook below to another hook above. Because of the orientation and features of the tabs and the box openings, connecting the stacked hooks to each other requires additional fasteners, and the entire support of one hook below another hook is provided by those fasteners.

Attaching a series of hooks to a common support, rather than attaching one hook to another hook for providing support, is shown Canadian Patent 2,315,025 and U.S. Pat. No. 7,520,476.

United States Published Application 2008/0093510 shows stacked hooks, with a plug projecting up from the hook below being installed vertically into a socket in the hook above. The orientation of the plug and socket prevents that connection alone from holding the hooks ganged, so that additional fastening is needed to secure one hook below another.

SUMMARY OF THE INVENTION

According to the invention, a first cable support hook may be supported by its support leg to a supporting surface, such as a wall, ceiling, support beam, etc. This support leg is typically the rear leg of the hook. The hook includes a top platform. The platform may be attached toward or at the top of one of the legs, preferably the rear or support leg or longer leg of the hook. The platform is optionally provided with a hook suspension fixture at the platform, such as a hole or other fixture at which a hook suspension element may be installed. This enables the hook to be supported from the suspension element, rather than by the support leg of the hook being fastened to a wall or other object. There may be alternative modes of supporting the hook.

Whether or not the top platform includes a suspension fixture, it includes a first attachment feature which enables a plurality of hooks to be stacked or ganged, with one hook according to the invention below another hook according to the invention.

In addition, the web between the legs of the hook has a respective second attachment feature that is complementary to the first attachment feature of a hook, such that one hook may be attached to another by sliding and guiding the first attachment feature of one hook below into the second attachment feature of another hook above. The sliding is preferably horizontally or transverse to the hook legs, along the front to rear direction.

In a preferred embodiment, a first attachment feature at the top side of the top platform, comprises a first guide device comprising at least one and preferably at least two, spaced apart, parallel, lateral slides which extend in the direction between the front and the rear legs of the hook.

In a preferred embodiment, a second attachment feature is preferably below the bottom of the web of the hook. It comprises a second guide device comprising spaced apart, opposing guide rails which also extend between the front and rear legs of the hook and are so positioned at the bottom of the web that the slide or slides at the top of one hook below can be slid along the rails below a second hook above. The same function can be achieved by having a slide or slides below the web of a hook and guide rails above the platform.

A stop along the front to rear slide path of the hooks positions the thus ganged hooks at desired locations.

An assembler of an array of hooks for supporting cable along a path may in situ stack or gang as many hooks as the assembler may select at any location along the cable path by adding a hook below a previously provided hook, and by sliding them together, preferably by the hook below being brought to the front of the hook above and then sliding the slides of the hook below rearwardly in the guide rails of the hook above.

The slides and guide rails are complementary so that two or more hooks can be stacked or ganged one under the other. Further, the orientation of the slides and guide rails causes the hook above to support the hook below at their slide and guide rail connection, without need for an additional fastener to prevent the two adjacent stacked hooks from separating, which might be primarily caused by the weight of the hook below with supported cable causing the hook below to separate from the hook above. Prior art of which the inventor hereof has knowledge has required an additional fastening connection between stacked hooks or from each hook to a support or else the hooks will separate from each other or from the support. The present invention makes such additional fastener unnecessary, although additional fasteners may be used for additional security, and the invention also makes such an additional fastener not the principal way for preventing separation of two stacked hooks.

As an additional feature of the hooks hereof, all rounded edges may be flared away from the cable carrying surface to avoid damage to the cable jackets. The edges of the hook, its slides and the rails are preferably rounded to eliminate edges or corners that may damage cable that may shift along the hook after installation due to the nature of the structure in which the cable is used and the nature of the use, and, more significantly, to prevent damage to cable as it is being installed and being pulled past the hook.

Yet another optional feature of the invention is a "cage" element that is closed above the web of the hook and encloses cable in the notch of the hook, and the cage is opened, e.g., by being swung open around one hinged end, to enable placement of the cable on the hook.

Other features of the present invention are described below with reference to a preferred embodiment shown in the accompanying drawing Figures in which:

BRIEF DESCRIPTION OF THE DRAWINGS

FIG. 4 is a bottom view of the hooks, corresponding to the condition of FIG. 2.

FIG. 5 is a bottom view corresponding to the condition of FIG. 3.

DETAILED DESCRIPTION OF A PREFERRED EMBODIMENT

Figure 1:
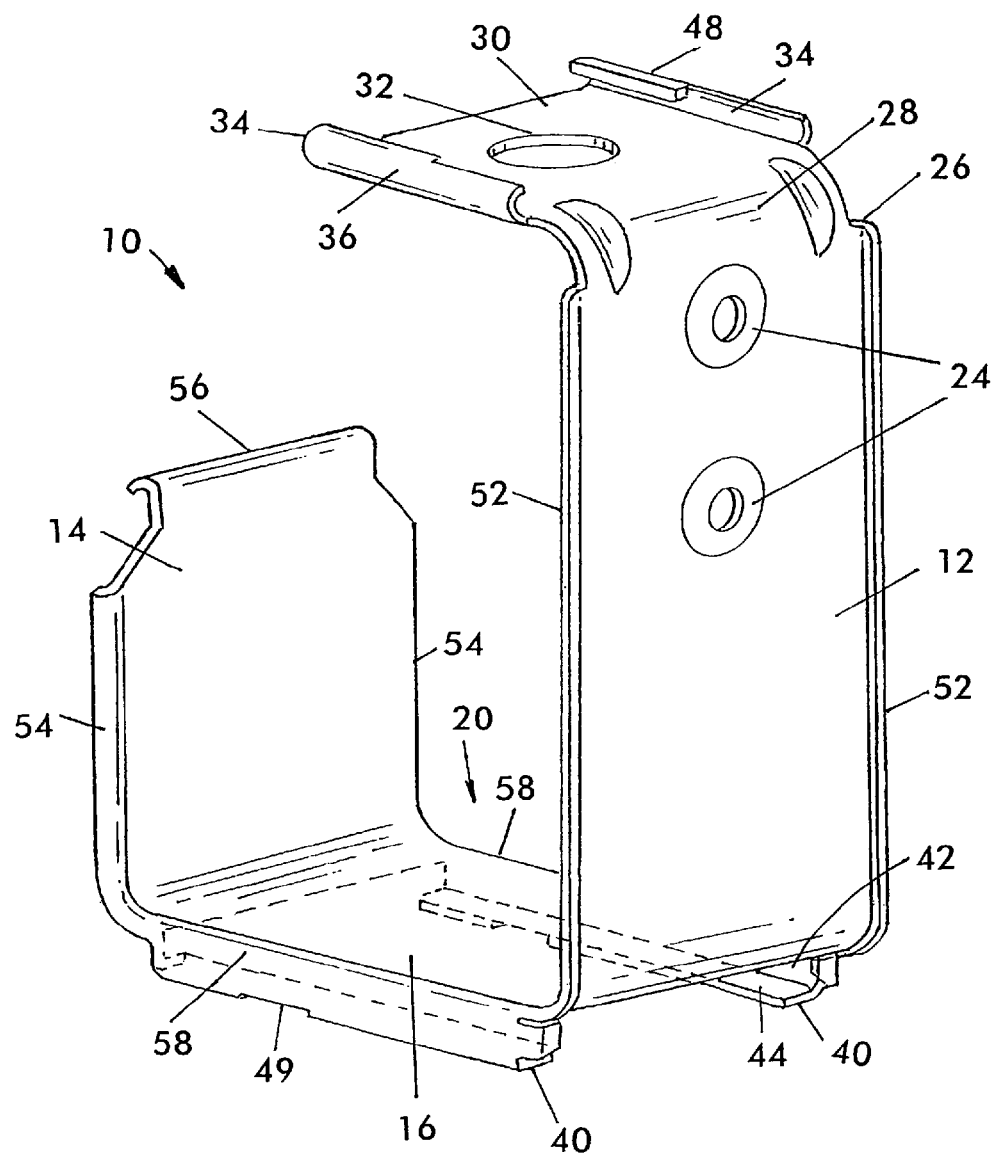
FIG. 1 is a first perspective view of a cable support hook incorporating the improvement disclosed herein.
Figure 2:
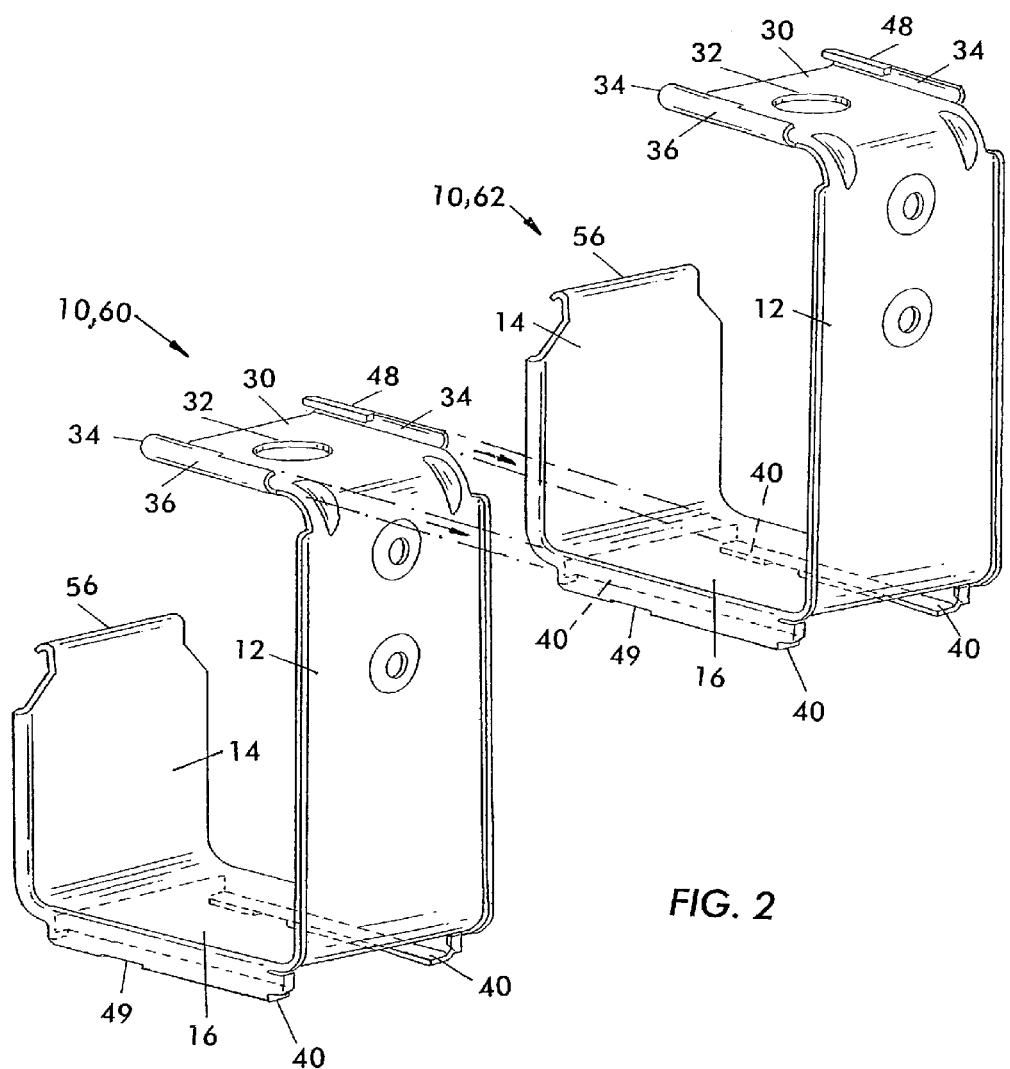
FIG. 2 is a perspective view of two of the hooks to be connected together.

Referring to FIGS. 1 and 2, a preferred embodiment of a hook 10 includes a first rear, longer leg 12, a second front, shorter leg 14 spaced away from and parallel to the rear leg 12 and a bottom web 16 joining the front and rear legs 12 and 14. The hook 10 has an overall shape of a "J". The legs 12, 14 and web 16 together define an open top notch 20 through which a plurality of cables 22 may be pulled and in which notch cable may be supported along a path in a manner known in the art.

The rear leg 12 is provided with openings 24 shaped, sized and positioned to receive conventional fasteners, not shown, such as bolts, screws, nails, etc., by which the hook may be fastened by its rear leg 12 to a support, such as a wall, not shown. This support provided to one hook may be sufficient for supporting a stack of the hooks, FIGS. 3 and 5, having features described herein.

At the top end 26 of the vertical rear leg 12, there is attached a forwardly directed, horizontal platform 30 oriented transversely to the rear leg. There is a connection 28 between the rear leg at 26 and the platform 30. The platform 30 has a fixture, such as the large opening 32 therein, which is sized and shaped to be connected with and to be suspended from a suspension element, not shown, which may be attached to a ceiling or wall. The opening 32 may be threaded to accommodate a threaded rod from which the hook is suspended. The hook may be supported at the openings 24 and/or at the opening 32 at the top platform 30.

A principal distinguishing feature of the hook 10 is a first fastening feature, which may be a slide, and is particularly shown in this example as a pair of parallel lateral slides 34 at the top of and above the platform 30 that are spaced apart laterally and are illustrated as being disposed along the opposite lateral edges of the platform 30, although they may not be at the edges. The illustrated slides have preferably rounded exteriors at 36, which are shaped for being guided in rails 40, described below. The exteriors 36 are rounded so as not to define sharp edges that may damage a cable being supported by the hook or being pulled past the hook during cable installation in the hooks.

Below the web 16 of the hook 10 there is a second fastening feature, which may be a pair of spaced apart, opposing, parallel rails 40, each rail placed so as to respectively cooperate with and to be possibly complementary to one of the slides 34, to guide movement of the slides, and the rails are shaped so that the slides may be slid along the rails. As illustrated, the rails 40 may be L-shaped in cross-section and open toward each other, with the vertical leg 42 of the rail engaging the curved exterior 36 of the respective slide it guides for positioning and guiding the slide, and with the horizontal leg 44 of the rail supporting the slide from below, thereby supporting the respective slides that are above the hook that is installed below the rails 40.

The slides at the upper platform 30 of the hook 60 below slide along the rails 40 below the web of the hook 62 above preferably by horizontal sliding of the hook below from the front toward the rear of the hook above. The hooks can be either first linked and then mounted to a support or an additional hook can be linked to a previously installed hook. All of the hooks in a stack may be suspended from the top hook in the stack and from a threaded rod or other support which supports the top hook.

Figure 3:
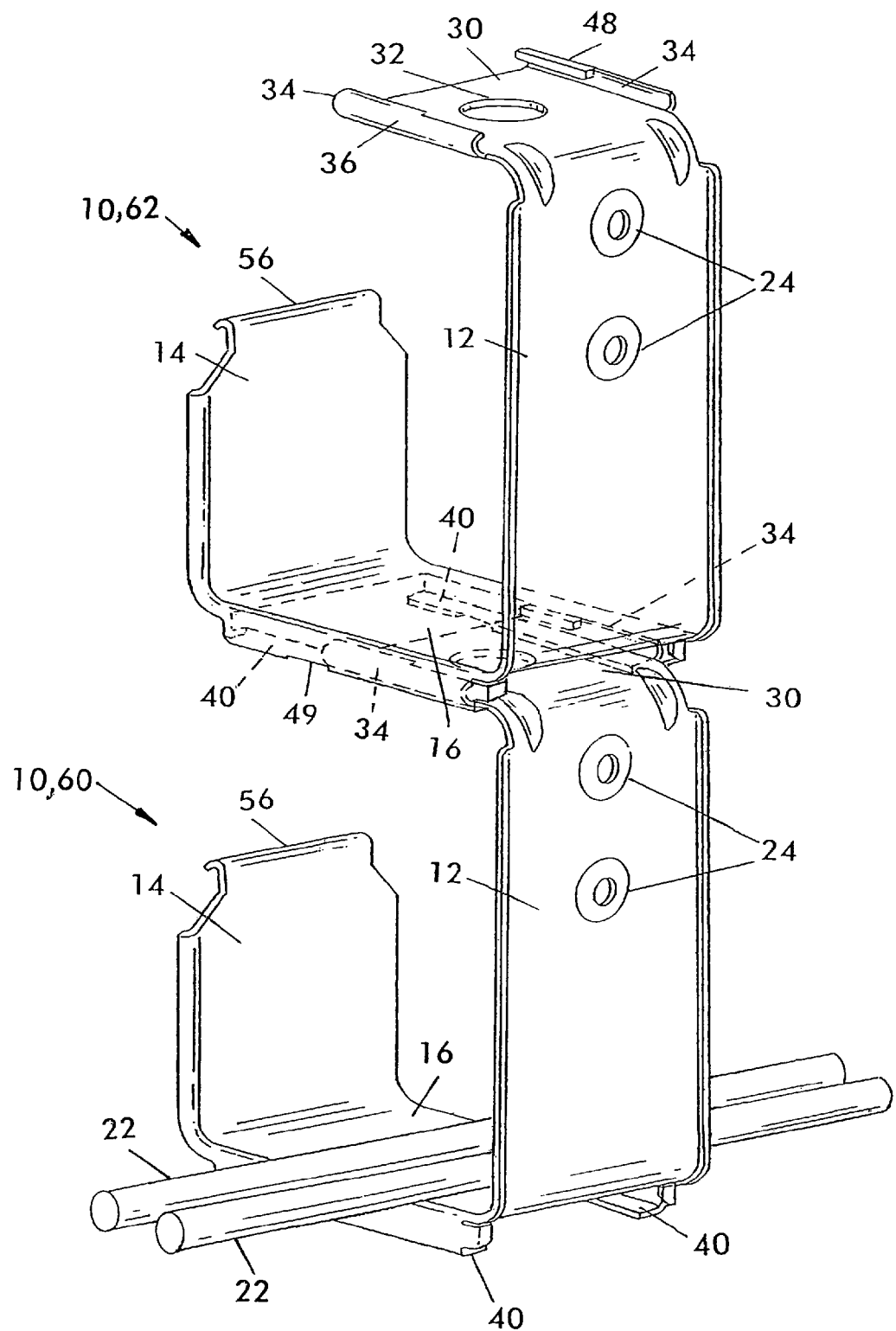
FIG. 3 is a view of hooks stacked and ganged according to the present invention.

An internal stop mechanism, such as a snap connection 48, 49 on the slide and/or the rail or track enables two stacked hooks to be locked into a selected locked position (FIGS. 3 and 5). That snap connection may cause the two hooks 60, 62 to be engaged at a position where the rear legs 12 of the hooks are vertically aligned, if that arrangement is selected, or with each hook below slightly forward of the hook above, however the designer chooses.

As an example, each rail may be provided with a stop 48 positioned between the front and rear legs of the hook so that the platform 30 of a hook below may be installed by sliding the slides 34 thereof rearwardly along the rails 40 of the hook above up to the stops 48. The stop or other interference element 48 engages a notch 49 in the respective rail 40, which positions the slides in their guide rails at the proper installation depth.

Although no additional securement devices between the upper platform 30 of the hook below and the web and rails 16, 40 of the hook above are illustrated or are needed, an additional fastening may be provided at the option of the designer of the hooks or the installer of one hook below another. The hook 10 is linkable to another hook above or below without need for any additional hardware or fastening devices.

All exposed edges corners, etc., of the hook may be flared and/or rounded so as to avoid damage to cables. Such rounding can be seen at the edges 52 of the rear leg 12, the lateral edges 54 and the top edge 56 of the front leg 14, the lateral edges 58 of the web 16 and on the slides 34 at 36.

FIG. 3 shows a pair of stacked or ganged hooks 10, one below the other. They may be stacked two or more hooks high as a particular installation may require.

Figure 6:
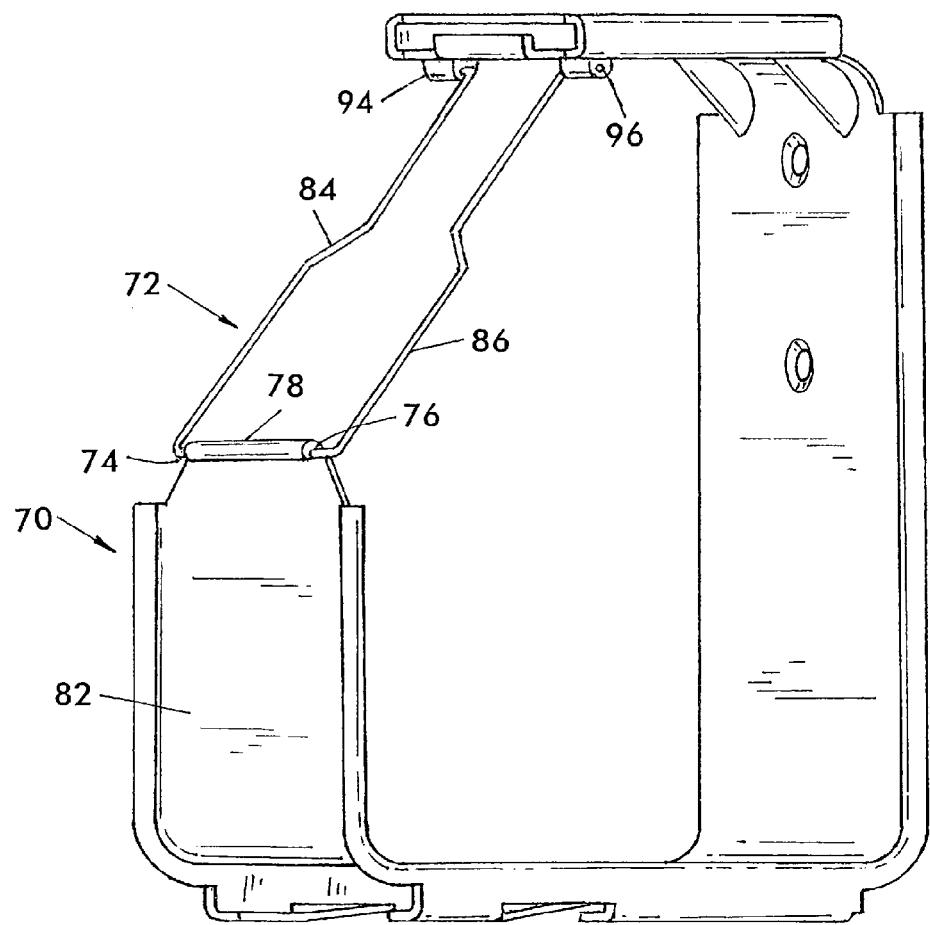
FIG. 6 is a perspective view of an alternative hook configuration.

FIG. 6 shows a hook 70 with all of the features of hook 10 described above and with an additional cage 72. The cage may be comprised of a bent u-shaped wire, having a web 74 that is received in a slot 76 defined in a folded-over edge 78 of the front leg 82 of the hook. The cage further comprises a pair of cage legs 84, 86 extending up from the web 84 to the underside of platform 92, where the ends of those legs are received in openings in fixtures 94, 96 beneath the platform. The cage extends over the notch to retain cable in the notch. The cage is opened and closed by an operator pinching the legs 84, 86 together to either attach or separate the legs and the fixtures.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A hook assembly for supporting cable passing the hook assembly, the hook assembly comprising:
    a first hook and a separate second hook, with one hook stacked above the other hook;
    each of the first and the second hooks comprising:
    a first leg, a second leg spaced forward of the first leg and a web joining the first and second legs, wherein the legs and web are placed to define the respective hook with a notch between the legs thereof and above the web thereof through which cable may be passed and in which cable may be supported;
    the first leg having a platform thereon extending in a direction transverse to the first leg;
    a first guide device at the platform and extending in the direction between the first and second legs;
    a second guide device at the web of the hook, extending in the direction between the first and second legs and shaped so that the first guide device at the platform of the first hook is received by the second guide device at the web of the second hook, the orientations of the first and second guide devices of both the first and second hooks are such that the first guide device at the platform of the second hook below may be engaged with and slid with respect to the second guide device at the web of the first hook above and be slid in a direction extending between the first and second legs to bring the second hook below into a position in which the first guide device at the platform of the second hook below is connected to and supported by the second guide device at the web of the first hook above.

2. The cable support hook assembly of claim 1, wherein a slide is one of the first and second guide devices and a rail shaped and positioned for cooperating with the slide is the other of the first and second guide devices of each of the first and second hooks.

3. The cable support hook assembly of claim 1, wherein the first guide device comprises a slide at one of the platform and the web and the second guide device comprises a rail at the other of the platform and the web, wherein the slide and the rail are shaped and oriented to enable the slide of one of the hooks to slide along the direction between the first and second legs of the other of the hooks and along the rail of the other hook for enabling installation of one hook below the other hook.

4. The cable support hook assembly of claim 1, wherein the first guide device comprises a slide at the platform and the second guide device comprises a rail at the web, the slide and the rail are shaped and oriented to enable the slide of the second hook below to slide along a direction between the first and second legs of the first hook above along the rail at the web of the first hook above for enabling installation of the second hook below the first hook.

5. The cable support hook assembly of claim 4, wherein the first guide device comprises a pair of parallel, spaced apart ones of the slides at the platform and the second guide device comprises a cooperating pair of respective ones of the rails at the web of the hook, the rails being shaped, positioned and configured such that the rails at the web of the first hook guide the slides at the platform of the second hook so that the slides move along the direction between the second and first legs of the first hook and so that the rails of the hook above support the slides of the hook below and thereby support the second hook below during and after installation of the second hook to the first hook above.

6. The cable support hook assembly of claim 5, wherein the slides on the platform extend generally in the direction between the first and second legs of the respective hook, whereby the slides are installed at the rails by movement generally parallel to the direction of extension of the web.

7. The cable support hook assembly of claim 5, wherein the slides are above the platform and the rails are below the web.

8. The cable support hook assembly of claim 6, further comprising a stop in at least one of the slides and the rails, the stop configured for enabling installation by sliding of the slides at the rails and for stopping the sliding installation at a selected location such that the second hook below will be selectively positioned along the rails of the first hook above.

9. The cable support hook assembly of claim 1, further comprising a supporting fixture at or connected with the first leg and configured to receive a support for the first leg, such that the first leg and thereby the hook may be supported at the support.

10. The cable support hook assembly of claim 9, wherein the support comprises at least one of a hole in the first leg and a hole in the platform at which hole an appropriate support or fastener may be received.

11. The cable support hook assembly of claim 1, wherein each of the first leg, the second leg and the web have edges where cable in the notch of the hook or being pulled through the notch of the hook may contact the edges, and those edges of the leg and the web are flared or rounded so as to avoid defining the edges which may damage cable in or pulled through the notch.

12. The cable support hook assembly of claim 1, wherein the first guide device is above the platform and the second guide device is below the web.

13. The cable support hook assembly of claim 1, further comprising a cage extending over the notch configured to retain cable in the notch.

* * * * *